United States Patent [19]
Karwowski et al.

[11] Patent Number: 4,585,657
[45] Date of Patent: Apr. 29, 1986

[54] AGGLOMERATED FLAVOR BITS

[75] Inventors: Jan Karwowski, Franklin Lakes, N.J.; James G. Bangert, Manuet, N.Y.; Robert F. Ferraro, Little Falls; Patricia M. Brede, Mendham, both of N.J.

[73] Assignee: Nabisco Brands, Inc., Parsippany, N.J.

[21] Appl. No.: 681,959

[22] Filed: Dec. 14, 1984

[51] Int. Cl.$^4$ .............................................. A23L 1/22
[52] U.S. Cl. .................................... 426/285; 426/453; 426/650; 426/658; 426/661
[58] Field of Search ............... 426/285, 103, 453, 650, 426/658, 661

[56] References Cited

U.S. PATENT DOCUMENTS

| 3,544,332 | 12/1970 | Leebens . | |
| 3,718,484 | 2/1973 | Glabe | 426/471 |
| 3,840,685 | 10/1974 | Lyall et al. . | |
| 3,868,471 | 2/1975 | Decelles et al. | 426/307 X |
| 3,876,811 | 4/1975 | Bonner et al. . | |
| 3,941,893 | 3/1976 | Glabe et al. . | |
| 3,950,551 | 4/1976 | Glabe et al. . | |
| 4,016,790 | 4/1977 | Cole . | |
| 4,075,356 | 2/1978 | Haag et al. . | |
| 4,156,020 | 5/1979 | Bohrmann et al. | 426/103 |
| 4,178,392 | 12/1979 | Gobble et al. . | |

Primary Examiner—Raymond N. Jones
Assistant Examiner—Carolyn Paden
Attorney, Agent, or Firm—Richard Kornutik

[57] ABSTRACT

A process and a product of a process for producing agglomerated flavor bits is disclosed. The agglomerated flavor bits are produced by mixing a sugar and a vegetable oil with a starch and a gum. Flavorings can be added to this blend. Upon mixing of this blend a corn syrup solution is added and agglomeration occurs. Following agglomeration, the particles are dried and sifted through a U.S. #6 mesh for size. Particles are suitable for use in cooked grain cereals and other foods.

4 Claims, No Drawings

AGGLOMERATED FLAVOR BITS

BACKGROUND OF THE INVENTION

1. Field of the Invention

This invention relates generally to flavoring additives of grain cereal products. More specifically, this invention relates to flavoring additives formed into distinct particles or bits for use in complete over-the-counter hot cereal mixes.

2. Description of the Prior Art

Home-cooked grain products, such as warm breakfast cereals, have traditionally been flavored at home by the preparer of the meal with the use of common condiments and flavorings. For example, the flavor of oatmeal, cream of rice products, and cream of wheat is most frequently enhanced by the addition of flavorings including cinnamon, fruit particles, or other additives and sweeteners, either during or just after the cooking of the cereal. In recent times, consumers have found ready-mixed, easily-prepared breakfast cereals desirable. The convenience of a ready-mixed breakfast cereal is enhanced by having all the ingredients necessary to prepare it mixed together within the packet or box supplied by the manufacturer, including the flavorings and sweeteners.

Manufacturers have provided flavorings for dry ready-to-eat cereals for years. These cereals are not cooked by the consumer and come prepared with flavorings and sweeteners ready-mixed into the product or applied to the surface of the cereal product. Those cereals, which have the flavorings ready-mixed in them, are generally flaked products in which sugar and other ingredients are incorporated into the dough mixture prior to the puffing or flaking of the final product. The resulting dough mass has the flavoring ingredients within its matrix upon puffing or baking. Products in which the flavorings are applied to the cereal surfaces are generally products upon which sugar and other flavorings have been sprayed after the cereal particles have been puffed or flaked. Generally, this results in a glaze or frosting on the individual cereal particles.

A methhod, which has proven unsatisfactory in the past for flavoring either a hot or a cold cereal, is one in which the flavoring is added as a separate and distinct particle with the contents of the cereal. The mixing of a granulated flavoring into a package containing a cereal does not provide the consumer with a properly flavored product. Vibrations occuring during shipping and handling of the product, cause segregation or layering to occur between the cereal particles and the flavoring particles, because of their different particle sizes. When this occurs the cereal particles poured by the consumer from the top of the package are separated from the flavoring particles which migrate and settle at the bottom of the package.

Equally undesirable is the addition of a separate packet containing the flavorings in the larger package containing the cereal. Manufacturing problems are increased with separate packaging because additional apparatuses are required to pour the flavorings into a packet and then place that packet into the larger cereal package before the cereal particles are added. Consumer acceptance is also poor with packaging of this kind. Separate packaging of the flavoring ingredients still requires the consumer to measure and mix them into the cereal during cooking.

Other difficulties also prevent the mixing of flavoring particles into home prepared hot cereals. For example, the flavoring particles must be compatible with the cereal particle during both storage and cooking. During cooking, the flavoring particles must melt at the cooking temperatures of the cereal product. Mixing of the ingredients used to make the flavoring particles into the cereal must not adversely affect the texture of the final cooked cereal product and must mix rapidly with the cooked cereal particles. Another difficulty is flavor loss which can occur through volatilization of the essential flavorings during storage of the product. Usually, flavor loss is presented or reduced through the use of special, more expensive packaging. Also, if the flavoring particles tend to accumulate at the bottom of the package, excess moisture can cause the flavoring particles to lump into a solid mass.

U.S. Pat. No. 3,544,332 to Leebens typifies the methods in which flavorings are added to cereal particles. In this case, a dry ready-to-eat cereal is obtained in which powdered additives are incorporated into the cereal flakes. The cereal dough is puffed or extruded at a specified moisture content into pieces. These pieces are then coated with a powdered additive such as sugar or dehydrated fruit. The powdered additive covers the surface and voids of the puffed pieces and then the puffed pieces are flaked. This process entraps the additive at or near the surface of the flakes. In this particular disclosure, the resulting cereal product is not intended to be cooked. Methods as disclosed in this reference are not suitable for incorporating flavorings into cereals intended for home cooking. Home cooked cereals cannot be made from puffed or extruded pieces because the integrity of the flakes is completely lost upon cooking. Such flakes break down or lose their particle integrity from the heat and mixing action that occurs during cooking of the cereal.

U.S. Pat. No. 3,840,685 to Lyall et al. discloses a method for applying sugar as a sweetener in a coating applied to cereal particles. The coating consists of a quantity of edible fats or oils with a quantity of an emulsifier and an aqueous sugar solution. The syrup of these ingredients has a specifically identified water content. The edible fat or oil with the emulsifier is added to the aqueous sugar syrup at a temperature of from 115° F. to 155° F. This is mixed and heated to 180° F. This mixture is applied to the cereal particles as a coating and then dried. This method eliminates the steps of applying oil and then sugar separately to the cereal particles. This method is not readily adaptable to home-prepared, hot cereals. The cereal particles in this reference are larger than those normally found in home-prepared, hot cereals. The use of this method to flavor the thin, light weight flakes of a home cooked, hot cereal causes clumping of the flakes and disrupts their particle integrity.

U.S. Pat. Nos. 3,941,893 and 3,950,551 both to Glabe et al. disclose a process and product of a composite sugar syrup agglomeration. These two processes involve the formation of dried flakes or ground flakes obtained from drying a thin film of aqueous syrups of numerous sugars or sugar containing products. The flakes in the first reference are formed in the presence of ungelatinized starch which is partially gelatinized in situ and/or in the presence of a soy protein. The flakes are agglomerated by adding a spray of water in small amounts to the flakes while tumbling them to form agglomerates. Drying occurs with continued tumbling until the agglomerates are no longer sticky. Further drying is completed on a tray or conveyor. The second reference, instead of forming agglomerates, produces an extrudable mixture. The agglomerates resulting from these processes are for consumption on ice cream or for use in baking and not for use in cooked grain cereals. The agglomerates of these processes are primarily concerned with delivering a particulate sweetening ingredient that retains its integrity upon contact with a food of a higher moisture content.

U.S. Pat. No. 4,016,790 to Cole discloses an agglomeration of cereal particles, which are double coated with fat and then a dilute syrup. The resulting product is a granola type mix. The method used to derive the product of this disclosure is primarily concerned with the mechanical operation of producing a cereal admixture. The final product is a combination of cereal, sweeteners, and flavorings, but is not intended to be used as a cooked cereal.

It is an object of this invention to produce agglomerated flavor bits which are used to sweeten and flavor grain cereals cooked by the consumer. It is also an object of this invention to provide a complete over the counter package of cereal in which cereal particles and flavorings particles remain evenly dispersed even after shipping and storage. The formula according to this invention achieves these objectives without adversely affecting the texture or other qualities of the grain cereal itself.

SUMMARY OF THE INVENTION

This invention includes a process for the production of agglomerated flavor bits or sweeteners. The process comprises the mixing of sugar with oil and spices, followed by the blending of this mixture with a starch and gum. To the blended composition, a corn syrup solution is added. Upon adding of the corn syrup solution, agglomeration occurs and sweetened flavor particles are formed. This product is then dried to the desired moisture to form solid particles. This invention includes the products produced by this process.

An alternative embodiment can include the extruding of the blended composition and then the drying of that product. The agglomerated particles in either embodiment can be screened through a sieve of a desired mesh and those particles which are too large may be ground to a smaller size to achieve the desired particle size.

DETAILED DESCRIPTION OF THE INVENTION

This invention produces agglomerated sweetened flavor bits or particles. The process to produce these bits comprises mixing a finely granulated sugar with vegetable oil. To this mixture a second sugar, such as 6X sugar, can also be added. In the preferred embodiment, other flavorings are then added to this mixture. Those flavorings can be varied depending upon the desired result of the final product.

In the preferred embodiment a vegetable food oil is used. An example of such an oil is corn oil, soy or cotton seed oil can be used. The oil serves to help the fine particles dissolve more quickly in preparing the finished cereal. Too much oil prevents the blend from properly agglomerating. Excess oil coats the dry ingredients and does not allow them to absorb water. The percent of oil used can be between 2 and 6 percent with best results obtained at 4 percent.

The flavorings contemplated by this invention include cinnamon, nutmeg, vanilla, carmel, and others. Alternative embodiments can include other natural or artifical flavors, small or ground dried fruit pieces, or dried fruit juices. Combinations of these flavorings also provide a suitable product.

Starch is added to the sugar, oil, and flavoring mixture. A desirable starch is a modified wheat starch. Other starches such as tapioca and corn, wheat, or potato starch products including flours and flakes, can be used. The starch serves to bind the particles better during agglomeration and also serves to thicken the final cooked cereal.

It is desirable to add a gum to the starch containing blend. In the preferred embodiment, guar gum is added. The guar gum serves as a binder and thickener. Other gums such as carboxy methyl cellulose, locust bean or alginates can be used. The gum used should be a high viscosity type. Typically, a 1 percent solution of the gum should have a viscosity above 3200 centipoises. Corn syrup solids can also be used as a binder. However, it is not essential for agglomeration. The corn syrup solids should have a dextrose equivalent of 30 or higher. Cereal flakes such as oats, corn or wheat can also be included to add body and build the agglomerates but are not essential. The addition of a small amount of baking soda opens up the texture which helps to dissolve the agglomerates more quickly during preparation of the cereal. However, the baking soda is not essential. To the blend of the above ingredients a corn syrup solution comprising a one to two mixture of corn syrup to water is added. Upon the addition of the corn syrup solution agglomeration occurs. Agglomeration is witnessed by the formation of granules caused by the adsorption of the water into the starch, gum, and sugar blend. The quantity of water used is sufficient to produce the granules, by causing the blend to become moist and crumbly. An excessive amount of water would cause the blend to be too wet and fluid and agglomeration would not occur. With too small of an amount of water, agglomeration does not occur. Too small a quantity of water leaves the blend dry and powdery. The addition of the proper amount water to the blend results in agglomeration because the water causes the sugar and starch blend to become sticky and cemented together to form larger particles.

After the granules are formed, they are dried in a convection oven or other suitable drying equipment. It is preferable to use a continuous flow, vertical dryer. In the preferred embodiment the oven is at a temperature of between about 190° F. and to about 220° F. The granules are dried in this oven for approximately 20 minutes in the presence of forced air. Higher temperatures or different sized ovens can effect the amount of time required to dry the granules and the hardness of the particles. Drying is complete when approximately 7 percent or less moisture content by weight is present within the agglomerates. A moisture content of approximately 5 percent is preferred. Care must be taken during the drying process to avoid excessive oven temperatures. At temperatures above that disclosed, the sugar in the agglomerated flavor bits begins to melt. Partial melting of the sugar during drying causes the agglomerates to harden to a point where they are hard to dissolve.

The dried agglomerates are then screened to obtain the desired particle size. A #5 U.S. mesh screen is used in the preferred embodiment. Particles larger then 5 mesh can be recycled and ground to produce the desired smaller size. Small particles having a distinct granular appearance are preferred. In any agglomerating or grinding process, a production of a small amount of "dust" or fines occurs. However, an excessive amount of fines is undesirable and results in a product that is not acceptable to the consumer. The presence of the proper amount of water in the blend prior to agglomeration generally prevents excessive dust formation. Not enough water results in an abundance of dust to result in the final product. Also, the binders such as starch or gums help to eliminate "dust" formation.

The agglomerated flavor bits can be mixed directly with the flakes of a home cooked grain cereal. Upon cooking, the agglomerated flavor bits dissolve in a water containing cereal. Typically, the bits dissolve at temperatures between about 150° F. and 212° F. after approximately 1 minute. Undesirably large particles do not always dissolve at all at this temperature and time range. Therefore, the screening process in the preferred embodiment is desirable.

Agglomerated flavor bits are also useful in a complete over the counter hot cereal when packaged with cereal grains or flakes. They can be used to thicken the cereal. This is largely the result of the starch and gum content of the agglomerated flavor bits. Because of this, a formula for cooked cereal may have to be adjusted so as to have the preparer of the cereal add more water prior to cooking.

If too much sugar or too course a sugar is used to produce the agglomerated flavor bits, a gritty product may result. Very fine sugars such as 10X do not have a greatly adverse effect upon the final product. However, they are more difficult to handle since they tend to become lumpy if stored too long.

EXAMPLE I

The following is an example to produce a cinnamon flavored agglomerated flavor bits and is the preferred embodiment. The ingredients are:

| Ingredients | Grams |
| --- | --- |
| Sugar, 6X | 220.0 |
| Sugar, F.G. | 500.0 |
| Modified wheat starch | 50.0 |
| Guar Gum | 20.0 |
| Vegetable oil | 50.0 |
| Salt | 20.0 |
| Cinnamon | 7.0 |
| Nutmeg | 1.5 |
| Vanillin | 1.70 |
| Caramel color | 4.5 |
| Processed corn cereal | 250.0 |
| Baking soda | 2.0 |
| Corn syrup solids | 50.0 |
| Instant oats | 50.0 |

The fine granulated sugar is mixed in a suitable mixer such as a ribbon or paddle mixer with the vegetable oil for approximately 1 to 2 minutes. Following this, the 6X sugar is added with the salt, cinnamon, nutmeg, vanilla, and caramel color. After approximately another minute the starch, guar gum, and corn cereal are added with the baking soda, corn syrup solids, and instant oats. These ingredients are mixed for another 1 to 2 minutes. To this mixture a blend of syrup and water is added at levels of 100 grams water with 50 grams of corn syrup. Continued mixing results in the formation of agglomerates.

The agglomerates are screened through a U.S. #5 mesh screen. They are then dried at 200° F. for approximately 15 minutes in the presence of forced air. After drying the agglomerates are again screened through a number 5 mesh screen. The agglomerates which are too large to pass through the mesh are ground and recycled back through the screen. Agglomerated flavor bits having a sweet cinnamon taste result from this example.

The agglomerates are added to cereal grains such as farina, instant oats, wheat flakes, rice, barley, or others.

EXAMPLE II

This example produces agglomerated flavor bits that sweetens a cereal without adding a flavor. The ingredients are:

| INGREDIENTS | GRAMS |
| --- | --- |
| Sugar, 6X | 221.0 |
| Sugar, F.G. | 500.0 |
| Modified wheat starch | 50.0 |
| Guar gum | 20.0 |
| Vegetable oil | 50.0 |
| Salt | 20.0 |
| Processed corn cereal | 250.0 |
| Baking soda | 2.0 |
| Corn syrup solids | 50.0 |
| Instant oats | 50.0 |

The same procedure as used in Example I is followed with this example except that the flavorings are omitted.

EXAMPLE III

This example produces agglomerated flavor bits without the use of a fine granulated sugar. The ingredients are:

| INGREDIENTS | GRAMS |
| --- | --- |
| Sugar (6X) | 240.0 |
| Modified wheat starch | 23.5 |
| Guar gum (high viscosity) | 15.0 |
| Vegetable oil | 2.6 |
| Salt | 5.8 |
| Cinnamon | 2.0 |
| Apple flavor | 2.0 |
| Citric acid | 1.4 |
| Malic acid | 1.5 |
| Caramel color | 0.2 |
| Water | 43.0 |

In a suitable mixer, blend sugar, modified wheat starch, guar gum, salt, acids, spices, color and flavor for 3 minutes. Add vegetable oil and blend an additional 3 minutes. Spray 43 grams of water, and continue mixing until agglomerates form.

Dry and screen as in previous examples.

EXAMPLE IV

The following example produces agglomerated flavor bits without the use of 6X sugar. The ingredients are:

| INGREDIENTS | GRAMS |
| --- | --- |
| Sugar, F.G. | 720.0 |
| Modified wheat starch | 50.0 |
| Guar gum | 20.0 |
| Vegetable oil | 50.0 |
| Salt | 20.0 |
| Cinnamon | 7.0 |
| Vanillin | 1.70 |

| INGREDIENTS | GRAMS |
| --- | --- |
| Caramel color | 4.5 |
| Processed corn cereal | 250.0 |
| Baking soda | 2.0 |
| Corn syrup solids 36DE | 50.0 |
| Instant oats | 50.0 |

This example uses the same procedure as Example I except that 6X sugar is not added.

EXAMPLE V

This example uses corn starch instead of modified wheat starch to produce agglomerated flavor bits. The ingredients are:

| INGREDIENTS | GRAMS |
| --- | --- |
| Sugar (6X) | 238.81 |
| Corn starch | 23.54 |
| Guar gum (high viscosity) | 14.88 |
| Vegetable oil | 2.61 |
| Salt | 5.80 |
| Cinnamon | 1.86 |
| Apple flavor | 1.86 |
| Citric acid | 1.39 |
| Malic acid | 1.51 |
| Caramel color | 0.20 |
| Water | 43.0 |

The same process as used in Example III is used for this example.

What is claimed is:

1. A process to make agglomerated bits, comprising:
   (a) mixing a granulated sugar with a vegetable oil to form an oleaginous sugar mixture;
   (b) blending into said oleaginous sugar mixture with starch from a starch containing ingredient and a gum, a 1 percent solution of said gum having a viscosity above 3200 centipoises;
   (c) agglomerating said blended oleaginous sugar mixture with an aqueous solution to form agglomerated bits, said blended oleaginous sugar mixture, said starch containing ingredient, and said aqueous solution being in a proportion sufficient to become cemented together; and
   (d) drying said agglomerated bits to the desired moisture content whereby said agglomerated bits dissolve within 1 minute on contact with hot water at a temperature between about 150° F. and 212° F.

2. The process according to claim 1, wherein a flavoring ingredient is added to said oleaginous mixture before said blending with said starch containing ingredient.

3. The process according to claim 1, wherein said starch containing ingredient is a member selected from a group consisting of fine corn flakes, modified wheat starch, wheat flakes, potato flakes, and combinations of these.

4. The process according to claim 3, wherein said gum is a member selected from the group consisting of guar gum, carboxy methyl cellulose, locust bean gum, and alginate gum.

* * * * *